United States Patent [19]
Lahti et al.

(10) Patent No.: US 7,237,262 B2
(45) Date of Patent: Jun. 26, 2007

(54) SYSTEM AND METHOD FOR ANTI-REPLAY PROCESSING OF A DATA PACKET

(75) Inventors: Gregg D. Lahti, Gilbert, AZ (US); Lee P. Noehring, Glendale, AZ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 1024 days.

(21) Appl. No.: 10/191,632

(22) Filed: Jul. 9, 2002

(65) Prior Publication Data

US 2004/0008711 A1    Jan. 15, 2004

(51) Int. Cl.
*G06F 9/00* (2006.01)
(52) U.S. Cl. .......................................... 726/13; 726/14
(58) Field of Classification Search ................ None
See application file for complete search history.

(56) References Cited

U.S. PATENT DOCUMENTS

| | | | |
|---|---|---|---|
| 6,157,955 A | 12/2000 | Narad et al. | |
| 6,295,616 B1 | 9/2001 | O'Connell et al. | |
| 6,327,625 B1 | 12/2001 | Wang et al. | |
| 6,389,537 B1 | 5/2002 | Davis et al. | |
| 6,978,384 B1 * | 12/2005 | Milliken ..................... | 726/26 |
| 2001/0007559 A1 | 7/2001 | Le Pennec et al. | |
| 2002/0001384 A1 | 1/2002 | Buer et al. | |
| 2002/0023210 A1 | 2/2002 | Tuomenoksa et al. | |
| 2002/0056001 A1 | 5/2002 | Magee et al. | |

OTHER PUBLICATIONS

U.S. Non-Provisional Application titled Method and System for High-Speed Processing IPSEC Security Protocol Packets by Noehring et al., filed Jun. 13, 2001, U.S. Appl. No. 09/880,701.
"Security Architecture for the Internet Protocol", by S. Kent, Network Working Group, Request for Comments 2401, Nov. 1998.

* cited by examiner

*Primary Examiner*—Nasser Moazzami
*Assistant Examiner*—Pramila Parthasarathy
(74) *Attorney, Agent, or Firm*—RatnerPrestia

(57) ABSTRACT

A system for processing a data packet to determine if a replay condition exists for the data packet, wherein the data packet comprises a sequence number for comparison to a highest sequence number. The processing system includes a mask register to store a mask value, wherein the mask value provides an indication of prior receipt by the system of a plurality of data packets, and a shifter comprising an input coupled to receive the mask value from the mask register, wherein the shifter is operable to shift a binary value by a number of bit positions, the number determined by a difference between the sequence number and the highest sequence number.

37 Claims, 2 Drawing Sheets

US 7,237,262 B2

SYSTEM AND METHOD FOR ANTI-REPLAY PROCESSING OF A DATA PACKET

BACKGROUND OF THE INVENTION

The present invention relates in general to data communications and, more particularly, to cryptographic processing systems such as, for example, systems for processing Internet Protocol Security (IPSec) packets to achieve high-speed security for the transmission of IP packets.

Security protocols are used widely in modern communications to provide secure transfer of information such as, for example, communication over the Internet. One such security protocol is the standard IPSec internet protocol security specified in "Request for Comments" (RFC) 2401, "Security Architecture for the Internet Protocol", which is hereby incorporated by reference.

IPSec is a method of protecting IP packets. IPSec can be used to protect one or more "paths" or tunnels between a pair of hosts, between a pair of security gateways (e.g., routers or firewalls implementing IPSec), or between a security gateway and a host. For example, a single encrypted tunnel can be created to carry all the traffic between two security gateways as in a secure virtual private network (VPN).

IPSec includes anti-replay protection, which detects the arrival of duplicate IP packets within a constrained window. In replay attacks, applications get bombarded with replay packets. IPSec overcomes this by detecting packets replayed by rogue hosts.

IPSec packets are protected against replay attacks by using a sequence number and a sliding receive window. The receive window can be any size greater than 32 packets. Each IPSec header for a packet contains a unique and monotonically increasing sequence number. A so-called security association is a construct that associates security services and a key with the packet traffic to be protected. When a security association is created, the sequence number is initialized to zero and prior to IPSec output processing, the value is incremented.

A received packet must be new and must fall either inside the receive window or have a sequence number greater than that of any prior received packet, otherwise the packet is dropped. A packet that is received late (i.e., having a sequence number less than the receive window) will be dropped.

Existing cryptographic processing systems typically perform anti-replay checks using software in a host processor or firmware in a network processor. One problem with existing anti-replay implementations is that the processing requirements are such that high-speed packet communications are difficult to achieve. For example, IPSec anti-replay processing implemented in a typical software processing system may hinder the ability to achieve broadband communications such as, for example, OC24 or OC192 data rate communications in optical networks. Another problem is that implementing anti-replay functionality in firmware increases the integrated circuit layout space required when manufacturing an embedded security processor to provide the anti-replay code in the firmware.

Because of the amount of processing required to support replay protection, prior software or firmware-based systems typically limit the size of the receive window to 32 or 64 packets. However, as communication rates increase to optical network speeds, it is desirable to have an even larger receive window to avoid losing valid packets with lower sequence numbers that arrive out of order, due to differing Internet routes used in transmission, and later than packets with higher sequence numbers.

Hence, there is a need for a cryptographic processing system and method that implements anti-replay protection at increased speeds to accommodate ever increasing secure communication speeds. There is also a need for a system and method that permits the ready use of larger receive window (i.e., anti-replay mask) sizes and that reduces the amount of program code required in software or firmware to perform security data packet processing.

BRIEF DESCRIPTION OF THE DRAWINGS

The invention is pointed out with particularity in the appended claims. However, a more complete understanding of the invention may be derived by referring to the detailed description and claims when considered in connection with the figures, wherein like reference numbers refer to similar items throughout the figures. The exemplification set out herein illustrates one or more embodiments of the present invention, and such exemplification is not intended to be construed as limiting in any manner.

DETAILED DESCRIPTION OF THE DRAWINGS

The present invention provides a cryptographic processing system and method for processing data packets such as, for example, IPSec data packets received from a network processor. The cryptographic processing system includes anti-replay functionality for inbound packets and is implemented in a hardware accelerator according to the present invention as described below. The cryptographic processing system also typically provides other security services for IPSec or other protocols, such as encryption, decryption, signing and verification of data packets at OC24 and greater data rates. The cryptographic processing system may be used to implement IPSec in the "tunnel" mode as well as in the "transport" mode.

The term "anti-replay" as used herein includes the anti-replay procedures associated with the IPSec protocol and also includes other security standards and algorithms generally in which a determination is made whether a packet has previously been received. The present invention may be used with IPSec or other security protocols.

The phrase "receive window" as used herein refers to a sequence number range that is available for checking whether inbound packets having sequence numbers within the sequence number range have been previously received. The receive window slides to higher sequence number ranges as new packets having sequence numbers greater than the current sequence number range arrive for processing. The term "register" as used herein is intended to include shift registers, other types of registers, and other memory storage elements that may be used to store a value for processing.

The phrase "next sequence number" as used herein refers to a sequence number for the data packet currently being received by the cryptographic processing system for which an anti-replay check is being performed. The phrase "highest sequence number" as used herein refers to the largest sequence number value for packets received prior to the data packet currently being processed, which current data packet itself has a next sequence number as mentioned above. The highest sequence number (HSN) is determined upon the receipt of each data packet by a comparison of the current value of the HSN to the value of the next sequence number (NSN) of the data packet just received by the cryptographic processing system. If the newly-received NSN is greater than the current value of the HSN, then the HSN is updated to equal the value of the newly-received NSN.

Figure 1:
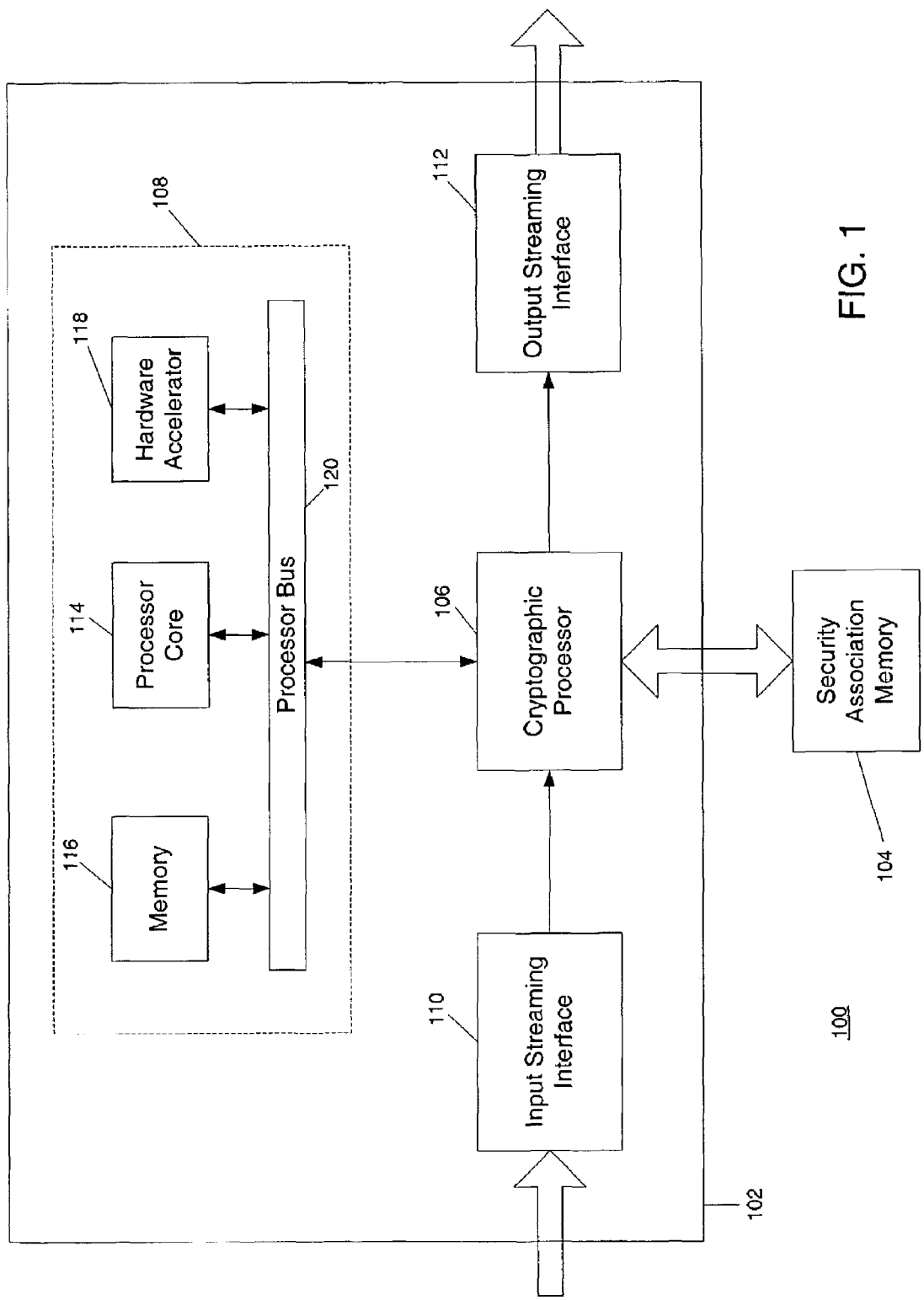
FIG. 1 illustrates a simplified functional block diagram of a cryptographic processing system, which includes an anti-replay accelerator, in accordance with an embodiment of the present invention.

FIG. 1 illustrates a simplified functional block diagram of a cryptographic processing system, which includes an anti-replay accelerator, in accordance with an embodiment of the present invention. System 100 includes a subsystem 102 coupled to an external memory 104, which may be used to store security association data such as security association key structures and anti-replay mask values for use in, for example, IPSec security processing in subsystem 102. Alternatively, memory 104 may be on the same chip as subsystem 102. Memory 104 may be implemented, for example, using a double data rate synchronous DRAM.

Subsystem 102 includes an input streaming interface 110 to receive data packets from, for example, a network processor (not shown) that may require security processing and provide the data packets to a cryptographic processor 106. An output streaming interface 112 returns data packets processed by processor 106 to, for example, the network processor. Cryptographic processor 106 performs, for example, IPSec processing on the received inbound packets. IP data packets are both received and transmitted to and from, for example, an external network (not shown) via the network processor. Input streaming interface may be, for example, a Packet-Over-SONET Physical-Layer Three (POS/PHY3) type streaming interface, although other interface types are suitable.

Subsystem 102 also includes a control system 108 comprising a processor core 114, a memory 116 coupled to processor core 114 by a processor bus 120, and a hardware accelerator 118 coupled to processor core 114 by processor bus 120. Processor core 114 controls and coordinates the operation of hardware elements and various aspects of the processing of data packets, including, for example, anti-replay checking, as the data packets move through subsystem 102. Processor core 114 communicates with cryptographic processor 106 via processor bus 120. Processor core 114 may be implemented, for example, as a 32-bit RISC processor core operating at 200 MHz or faster and running microcode stored in memory 116.

Hardware accelerator 118 provides for acceleration of anti-replay operations. Accelerator 118 may also provide for hardware processing of additional security operations. For anti-replay acceleration, anti-replay mask values are retrieved under control of processor core 114 from a security association database stored in memory 104. The mask values are loaded into accelerator 118 in preparation for anti-replay processing, as described further below. Accelerator 118 provides for hardware acceleration of anti-replay checking, which improves performance over what is typically achievable when performing anti-replay checking using firmware in memory 116. A non-limiting example of a cryptographic processing system that is suitable for use with accelerator 118 is described in U.S. non-provisional application Ser. No. 09/880,701 (titled "Method and System for High-Speed Processing IPSec Security Protocol Packets", by Lee P. Noehring et al., filed Jun. 13, 2001), which is hereby incorporated by reference.

An anti-replay check is performed by accelerator 118 to verify that duplicates of a data packet are not being received. When the packet fails the anti-replay check, the packet is preferably dropped and an error log is created and is preferably sent to the network processor (not shown). After anti-replay processing by accelerator 118, the anti-replay mask values in the security association database stored in memory 104 are updated.

Figure 2:
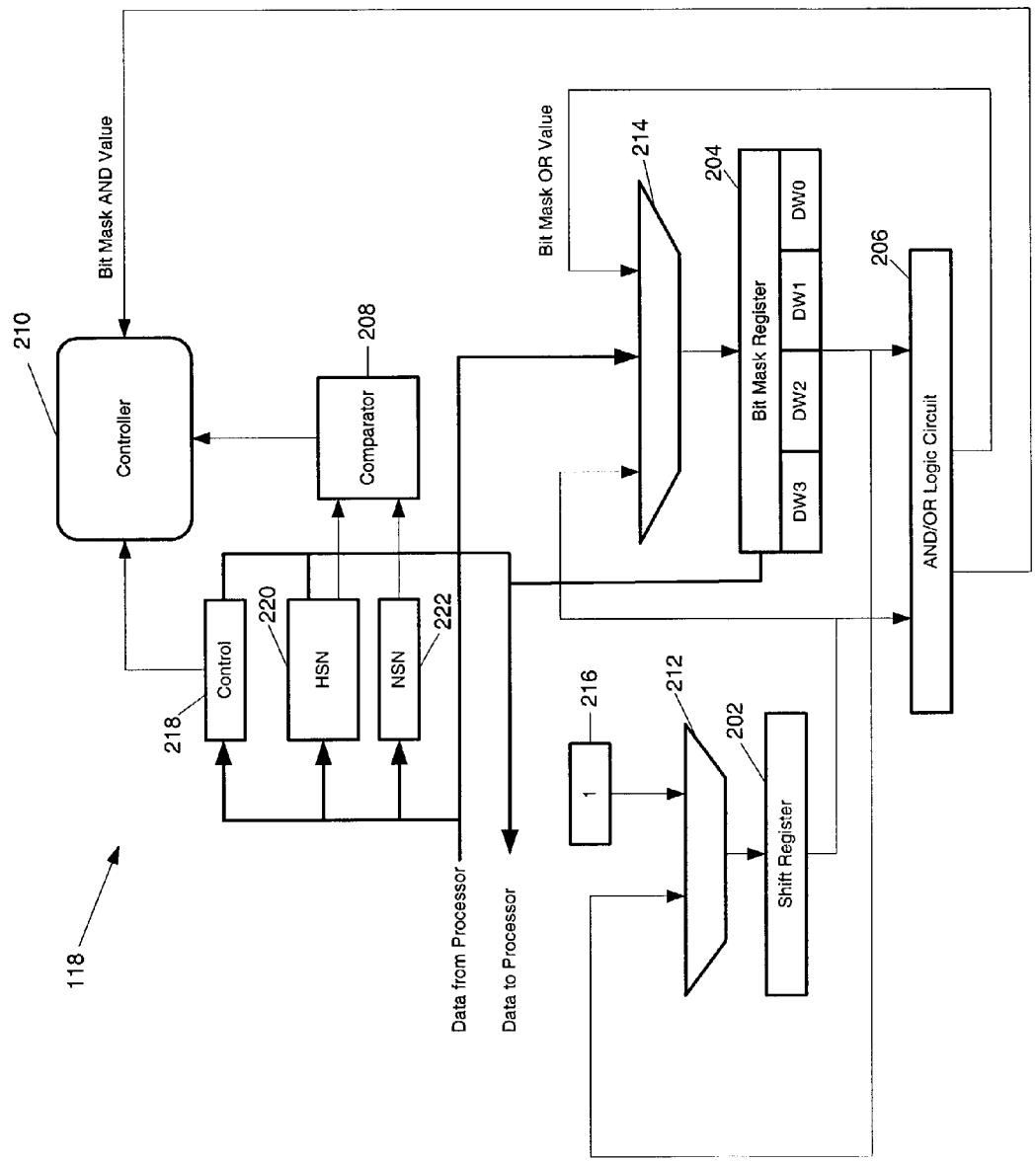
FIG. 2 illustrates a simplified functional block diagram of an anti-replay accelerator, in accordance with an embodiment of the present invention, suitable for use in the cryptographic processing system of FIG. 1.

FIG. 2 illustrates a simplified functional block diagram of accelerator 118 in accordance the present invention. Accelerator 118 performs anti-replay processing for data packets received by cryptographic processing system 100. Accelerator 118 processes a data packet to determine if a replay condition exists for the data packet. The data packet as received includes a sequence number, which is described below as a next sequence number (NSN).

Accelerator 118 includes a mask register 204 used to store a mask value. The mask value is, for example, 128 bits wide, and each bit position of the mask value has a value of either a zero, indicating that a packet having a sequence number corresponding to that bit position has not been previously received, or a "1", indicating that a packet having a sequence number corresponding to the bit position has been received previously. The sequence numbers tracked by the mask value are set relative to the highest sequence number (HSN) for previously-received packets, as is conventional for the IPSec protocol anti-replay function. The mask value in this example contains four double words, each 32 bits wide, indicated as DW3, DW2, DW1, and DW0. Prior to starting processing, the current mask value, corresponding, for example, to the IPSec tunnel over which data packets are being received, is loaded into mask register 204 by processor core 114 (see FIG. 1).

Accelerator 118 also includes shifter 202 coupled to receive the mask value from mask register 204. Shifter 202 is, for example, a barrel shifter that performs a left or right shifting of a binary value stored in shifter 202 using a zero fill to provide a shifted value. More specifically, shifter 202 may be, for example, a 128-bit left barrel shifter, as presented in the example below. The number of bit positions shifted is determined by a comparison of the NSN and the HSN, as described below. Shifter 202 is also able to load an initial binary value 216 such as, for example, 0x0000 . . . 00001 for left-shifting which will be shifted based on the comparison of NSN and HSN, as described below. For an alternative right-shifting embodiment, the initial binary value may be 0x8000 . . . 0000. A multiplexor 212 operates under the control of a controller 210 to select the input to shifter 202. Controller 210 is, for example, a state machine.

The output of shifter 202 is coupled to a selectable input to mask register 204. Also, the output of a logic circuit 206 is coupled to another selectable input to mask register 204. As will be described further below, logic circuit 206 accepts two inputs and provides both a logical AND result and a logical OR result (indicated in FIG. 2 as Bit Mask OR Value and Bit Mask AND Value). The inputs to logic circuit 206 are the output of shifter 202 and the output of mask register 204. Logic circuit 206 generally includes any circuitry operable to implement a logical AND function and a logical OR function. Examples of logic circuit 206 include both integrated AND/OR logic circuitry and separately-implemented AND and OR logic circuits. A multiplexor 214 under the control of controller 210 selects the input to mask register 204.

Accelerator 118 includes a control register 218, and registers 220 and 222 for storing sequence number information (indicated for purposes of illustration as "HSN" and "NSN" registers in FIG. 2). HSN register 220 stores a highest sequence number corresponding to the plurality of data packets that have previously had anti-replay checking processing done. NSN register 222 stores the next sequence number for the data packet currently being processed by cryptographic processing system 100. In addition to the current mask value loaded into accelerator 118 as mentioned above, the current HSN value and the NSN value corresponding to the data packet currently being processed are loaded into registers 220 and 222 prior to starting processing. Also, a control bit (e.g., a "Start" bit) in control register 218 is set to "1" by processor core 114 to indicate to controller 210 that anti-replay processing should begin. After anti-replay processing is done, one or more additional bits in control register 218 are set to indicate the results of the anti-replay check, including whether the anti-replay check is passed and information about the type of any error condition to be indicated to processor core 114.

A comparator 208 accepts the HSN and NSN values as inputs. Comparator 208 compares the HSN and NSN to determine if the HSN is greater than the NSN and provides a corresponding output to controller 210. Also, controller 210 or comparator 208 preferably comprises two subtractors (not shown) to determine the difference between HSN and NSN (i.e., (HSN−NSN) and (NSN−HSN)), as used in the method of the present invention described below. The result of the comparison to determine if HSN is greater than NSN may be used to select one of the two subtractor results for further use in anti-replay processing (as will be more apparent following the discussion of the processing method below). After anti-replay processing is complete, the updated mask value in mask register 204, the control information in control register 218, and the HSN (updated as appropriate during processing) in HSN register 220 are read by processor core 114.

Now describing an example of the operation of accelerator 118 in more detail, firmware in memory 116 directs processor core 114 to load the current mask value from security association memory 104 into mask register 204 and the current HSN into HSN register 220. The firmware directs the extraction of the NSN from the data packet currently being processed and the writing of the NSN to NSN register 222. The firmware then directs the setting of a control bit (e.g., the Start bit) to start anti-replay processing.

Initially, shifter 202 is preset to store an initial binary value of "1" (i.e., 0x0000 . . . 00001). The initial binary value may be later used contingent on other processing.

The HSN is compared to the NSN. If the HSN is greater than the NSN, the result from the subtractor mentioned above that calculates the difference (described as a "shift count" herein) of (HSN−NSN) is used. The shift count is compared to the mask size of the mask register. If the shift count is greater than (mask size −1), then this is considered an error condition and control bits (denoted as "Pass" and "Replay") are set to "0". In the embodiment described below, the Pass bit is set if the sequence number of the current data packet does not duplicate the sequence number of any other packets received within the tracking history of the mask value and if the packet's sequence number is not less than those tracked by the mask value. The Replay bit is set if the packet's sequence number duplicates a sequence number of a previously received packet as indicated by the mask value. The Replay bit is cleared is the packet's sequence number is less than those tracked by the mask value.

If the shift count is less than or equal to (mask size −1), then the initial binary value in shifter 202 is shifted left with a zero fill by the shift count to provide a shifted binary value in shifter 202 that indicates a "1" in the bit position of shifter 202 corresponding to the receipt of a data packet having a sequence number in the same position relative to the current HSN. It should be noted that although shifter 202 is specifically described herein as a left shifter and the initial binary value has a "1" in its least-significant bit, in other embodiments a right shifter could be used and the initial binary value could have a "1" in its most significant bit with zeroes in the remaining bit positions.

The shifted binary value from shifter 202 is then logically AND'ed with the mask value from register 204 by AND logic in logic circuit 206 and the logical result is provided to controller 210. If the logical AND result is a non-zero value, then a replay condition exists for the data packet and the Pass and Replay control bits in control register 218 are set as Pass=0 and Replay=1.

If the logical AND result is a zero, then Pass=1 indicating that a replay did not occur. Then, the mask value in mask register 204 is updated to provide a "1" in the bit position (relative to the HSN value) that corresponds to the sequence number of the current data packet. The mask value is updated by performing a logical OR of the shifted binary value and the current mask value using OR logic in logic circuit 206. The logical OR result is provided via multiplexor 214 as an input to update mask register 204.

If from the comparison of HSN and NSN above, the NSN is greater than the HSN, then the shift count is determined as (NSN−HSN) using the other subtractor mentioned above. The mask value from mask register 204 is loaded into shifter 202 and shifted left by the shift count. This shifted mask value is loaded back into mask register 204. Then, the least significant bit of the shifted mask value is set to a "1" to indicate that the sequence number of the current data packet has now been received. This setting is done by OR'ing the shifted mask value with a value "1" (i.e., 0x0000 . . . 00001) that is loaded into shifter 202 and then provided from shifter 202 as an input to logic circuit 206. The logical OR result is loaded into mask register 204 to provide the final updated mask value that will be read by processor core 114 once anti-replay processing for the current data packet is indicated as complete by control register 218.

Next, the HSN is set to equal the NSN and the Pass bit is set to "1". Once the anti-replay processing is complete, the Start bit is cleared and set to "0" to indicated to processor core 114 that the anti-replay operation is completed. The updated mask value and updated HSN are read by processor core 114. Also, controller 210 updates the HSN register with the new HSN value.

An example of a specific processing method according to the present invention is provided in pseudo-code form in Table 1 below. In Table 1, the shift count is indicated as "ShiftCnt", the mask value is indicated as "BitMaskRegister", and the contents of the shifter are indicated as "CompareRegister".

TABLE 1

```
If Start == 1
    If HSN > NSN
        ShiftCnt = HSN − NSN
        if(ShiftCnt > 127)
            Pass = 0
            Replay = 0
        Else
            CompareRegister = 0x000...001<<ShiftCnt
            If CompareRegister & BitMaskRegister
                Pass = 0
                Replay = 1
```

TABLE 1-continued

```
        Else
            BitMaskRegister |= CompareRegister
            Pass = 1
    Else
        ShiftCnt = NSN - HSN
        BitMaskRegister<<ShiftCnt
        BitMaskRegister |= 0x000...001
        HSN = NSN
        Pass = 1
Start = 0
```

The anti-replay processing described for accelerator 118 above may be performed for each data packet in parallel with other processing of each data packet by processor core 114 and/or by cryptographic processor 106. Such processing in parallel reduces the overall number of clock cycles that cryptographic system 100 requires to fully process a data packet. Anti-replay processing by accelerator 118 as described above may take, for example, about 4 to 5 clock cycles to complete processing.

By the foregoing description, a novel cryptographic processing system and method for performing anti-replay checking have been disclosed. The system and method of the present invention implement anti-replay protection at increased speeds to accommodate ever faster secure communication speeds, permit the use of a larger anti-replay mask size, and reduce the amount of program code required in software or firmware to perform security data packet processing.

Although specific embodiments have been described above, it will be appreciated that numerous modifications and substitutions of the invention may be made. For example, the anti-replay mask and shift register bit sizes can be varied from the example described above. Also, the present invention may be useful in organizing inbound packets in a segmentation and reassembly (SAR) function for ATM traffic, in which keeping track of incoming packets in a possible out-of-order sequence may be done. Accordingly, the invention has been described by way of illustration rather than limitation.

What is claimed is:

1. A method for processing a data packet, the method comprising:
    storing a mask value, herein the mask value provides an indication of prior receipt of at least a portion of he plurality of previous packets;
    comparing a next sequence number (NSN) of the data packet to a highest sequence number (HSN), wherein the HSN corresponds to a largest sequence number value from a plurality of previous packets received prior to the data packet;
    if the HSN is greater than NSN:
        (i) determining a shift count to be (HSN−NSN);
        (ii) determining compare value using the shift count, comprising shifting an initial binary value to the left or right by a number of bit positions corresponding to the shift count, the initial binary value comprising a "1" in either a least-significant or a most-significant bit position of the initial binary value and zeroes in all other bit positions of the initial binary value; and
        (iii) comparing the compare value to the mask value comprises providing a logical result indicating whether a replay condition exists for the data packet; and if HSN is not greater than NSN:
        (i) determining a shift count to be (NSN−HSN);
        (ii) updating the ask value using the shift count; and
        (iii) setting the HSN value to the NSN value.

2. The method of claim 1 wherein comparing the compare value to the mask value comprises logically AND'ing the compare value with the mask value.

3. The method of claim 1 further comprising, if the shift count is greater than a fixed value, providing an indication that the data packet is outside a receive window corresponding to the mask value.

4. The method of claim 3 wherein:
    the mask value has a mask size corresponding to the maximum number of packets for which the mask value can provide the indication of prior receipt of the plurality of previous packets; and
    the fixed value is (mask size −1).

5. The method of claim 4 wherein providing the indication that the data packet is outside the receive window comprises setting a control bit in a control.

6. The method of claim 1 further comprising, if the logical result indicates that a replay condition does not exist for the data packet, updating the mask value by logically OR'ing the mask value with the compare value.

7. The method of claim 1 wherein updating the mask value using the shift count comprises shifting the mask value by a number of bit positions equal to the shift count.

8. The method of claim 1 wherein updating the mask value using the shift count comprises updating the mask value to indicate receipt of the data packet.

9. The method of claim 8 wherein updating the mask value to indicate receipt of the data packet comprises setting either a least-significant or a most-significant bit position of the mask value to a "1".

10. The method of claim 9 wherein updating the mask value comprises logically OR'ing the mask value with a binary value comprising a "1" in either a least-significant or a most-significant bit position of the binary value and zeroes in all other bit positions of the binary value.

11. The method of claim 8 further comprising, if the HSN is not greater than the NSN, providing an indication that a replay condition did not occur.

12. The method of claim 11 wherein providing the indication that the replay condition did not occur comprises setting a control bit in a control register.

13. A method for processing a data packet, the method comprising:
    (a) storing a mask value, wherein the mask value provides an indication of prior receipt of at least a portion of he plurality of previous packets;
    (b) comparing a next sequence number (NSN) of the data packet to a highest sequence number (HSN) to determine a shift count, wherein the HSN corresponds to largest sequence number value from a plurality of previous packets received prior to the data packet;
    (c) if the HSN is greater than NSN:
        (i) determining a compare value using the shift count, wherein determining the compare value comprises shifting an initial binary value by a number of bit positions corresponding to the shift count; and
        (ii) comparing the compare value to the mask value comprises (i) logically AND'ing the compare value with the mask value to determine whether a replay condition exists for the data packet, and (ii) if the logical result indicates that a replay condition does not exist for the data packet, updating the mask value by logically OR'ing the mask value with the compare value; and (d) if the NSN is greater than HSN, updating the mask value using the shift count.

14. The method of claim 13:

wherein comparing th compare value to the mask value comprises providing a logical result indicating, whether a replay condition exists for the data packet; and further comprising, if the NSN is greater than the HSN, setting the HSN value to the NSN value.

15. The method of claim 14 wherein, if the NSN is greater than the HSN, updating the mask value to indicate receipt of the data packet comprises setting either a least-significant or a most-significant bit position of the mask value to a "1".

16. A system for processing a data packet to determine if a replay condition exists for the data packet, wherein the data packet comprises a sequence number for comparison to a highest sequence number, the system comprising:

a mask register to store a mask value, wherein the mask value provides an indication of prior receipt by the system of a plurality of data packets; and a shifter comprising an input coupled to receive the mask value from the mask register, wherein the shifter is operable to shift a binary value by a number of bit positions, the number determined by a difference between the sequence number of the data packet and the highest sequence number, to provide a shifted value, and wherein:

if the highest sequence number is greater than the sequence number of the data packet, the binary value is an initial binary value comprising a "1" in either a least-significant or a most-significant bit position of the initial binary value and zeroes in all other bit positions of the initial binary value, and if the sequence number of the data packet is greater than the highest sequence number, the binary value is the mask value.

17. The system of claim 16 wherein the shifter is further operable to shift the mask value received from the mask register by a number of bit positions determined by the difference between the sequence number of the data packet and the highest sequence number.

18. The system of claim 17 wherein the mask register is coupled to an output of the shifter to receive the shifted value.

19. The system of claim 18 further comprising a comparator coupled to receive the sequence number of the data packet and the highest sequence number as inputs.

20. The system of claim 19 further comprising:

an HSN register, comprising an output coupled to the comparator, to store the highest sequence number; and an NSN register, comprising an output coupled to the comparator, to store the sequence number of the data packet.

21. The system of claim 17 further comprising a logic circuit coupled to receive an output from the shifter and coupled to receive an output from the mask register.

22. The system of claim 21 wherein the logic circuit is operable to logically OR the output from the shifter with the output from the mask register to provide a logical OR result and is operable to logically AND the output from the shifter with the output from the mask register to provide a logical AND result.

23. The system of claim 22 wherein the logical AND result is used to determine if the replay condition exists for the data packet.

24. The system of claim 22 wherein the mask register comprises an input coupled to receive the logical OR result from the logic circuit.

25. The system of claim 16 further comprising a multiplexor coupled to selectively provide the initial binary value or the mask value as an input to the shifter.

26. A system for processing a data packet to determine if a replay condition exists for the data packet, wherein the data packet comprises a sequence number for comparison to a highest sequence number, the system comprising:

a mask register to store a mask value, wherein the mask value provides an indication of prior receipt by the system of a plurality of data packets;

a shifter comprising an input coupled to receive the mask value from the mask register, wherein the shifter is operable to: (i) shift a binary value by a number of bit positions, the number determined by a first difference between the sequence number and the highest sequence number, to provide a shifted value, and (ii) shift the mask value received from the mask register by a number of bit positions determined by a second difference between the sequence number and the highest sequence number; and a logic circuit coupled to receive an output from the shifter and coupled to receive an output from the mask register, wherein: (i) the logic circuit is operable to logical OR the output from the shifter with the output from the mask register to provide a logical OR result and is operable to logically AND the output from the shifter with the output from the mask register to provide a logical AND result, and (ii) the logical AND result is used to determine if the replay condition exists for the data packet.

27. The system of claim 26 wherein the mask register comprises an input coupled to receive the logical OR result from the logic circuit.

28. The system of claim 27 further comprising:

a comparator coupled to receive the sequence number of the data packet and the highest sequence number as inputs; and a controller coupled to an output of the comparator, wherein the controller is coupled to receive the logical AND result as an input.

29. The system of claim 28 wherein the binary value is an initial binary value comprising a "1" in either a least-significant or a most-significant bit position of the initial binary value and zeroes in all other bit positions of the initial binary value.

30. The system of claim 29 further comprising:

a processor core coupled to the controller through a control register;

a security association memory coupled to the mask register;

a first multiplexor coupled to selectively provide the initial binary value or the mask value as an input to the shifter; and a second multiplexor, coupled between the security association memory and the mask register, to selectively provide the logical OR result an initial mask value from the security association memory, or the shifted value as an input to the mask register.

31. The system of claim 30 wherein:
the output from the mask register is a first output and;
the mask register comprises a second output coupled to provide an updated mask value to the security association memory.

32. The system of claim 31 wherein the control register comprises a control bit that is set to indicate the presence or absence of the replay condition for the data packet.

33. The system of claim 32 wherein:
the control register further comprises a start bit; and
the processor core sets the start bit to initiate processing of the data packet to determine if the replay condition exists.

34. A system for processing a security data packet, the system comprising:
an input streaming interface;
a cryptographic processor coupled to receive a plurality of data packets from the input streaming interface;
a security association memory coupled to provide security association data to the cryptographic processor for cryptographic processing of the plurality of data packets;
a processor core coupled to control at least a portion of the cryptographic processor; and
an accelerator, coupled to the processor core, for processing each data packet of the plurality of data packets to determine if a replay condition exists for the data packet, wherein the data packet comprises a sequence number for comparison to a highest sequence number, the accelerator comprising: a mask register to store a mask value, wherein the mask value provides an indication of prior receipt by the system of at least a portion of the plurality of data packets;
a shifter comprising an input coupled to receive the mask value from the mask register, wherein the shifter is operable to: (i) shift a binary value by a number of bit positions, the number determined by a first difference between the sequence number and the highest sequence number, to provide a shifted value, (ii) shift the mask value received from the mask register by a number of bit positions determined by a second difference between the sequence number and the highest sequence number; and
a logic circuit coupled to receive an output from the shifter and coupled to receive an output from the mask register, wherein: (i) the bale circuit is operable to logically OR the output from the shifter with the output from the mask register to provide a logical OR result and is operable to logically AND the output from the shifter with the output from the mask register to provide a logical AND result, and (ii) the logical AND result is used to determine if the replay condition exists for the data packet.

35. The system of claim 34 wherein:
the output from the mask register is a first output; and
the mask register comprises a second output coupled to provide an updated mask value to the security association memory.

36. The system of claim 34 wherein each data packet is an IPSec security protocol packet.

37. The system of claim 34 wherein the accelerator performs anti-replay processing for each data packet in parallel with other processing of each data packet by the processor core.

* * * * *